(12) United States Patent
Cummings

(10) Patent No.: US 12,552,147 B1
(45) Date of Patent: Feb. 17, 2026

(54) CREASE REINFORCED DOUBLEWALL CORRUGATED BOARD

(71) Applicant: Semi Corr Containers, Inc., Phillips, WI (US)

(72) Inventor: James Alan Cummings, Phillips, WI (US)

(73) Assignee: Semi Corr Containers, Inc., Phillips, WI (US)

( * ) Notice: Subject to any disclaimer, the term of this patent is extended or adjusted under 35 U.S.C. 154(b) by 0 days.

(21) Appl. No.: 19/071,213

(22) Filed: Mar. 5, 2025

Related U.S. Application Data

(60) Provisional application No. 63/749,147, filed on Jan. 24, 2025.

(51) Int. Cl.
*B32B 29/08* (2006.01)
*B32B 3/28* (2006.01)
*B32B 29/00* (2006.01)

(52) U.S. Cl.
CPC ............. *B32B 29/08* (2013.01); *B32B 3/28* (2013.01); *B32B 29/005* (2013.01)

(58) Field of Classification Search
CPC ........... B32B 3/28; B32B 7/14; B32B 29/005; B32B 29/08; B32B 2317/127; B32B 2250/05; B32B 2250/26; B32B 2250/42; B65D 65/403; B31F 1/2813
See application file for complete search history.

(56) References Cited

U.S. PATENT DOCUMENTS

| | | | |
|---|---|---|---|
| 2,758,047 A * | 8/1956 | Dowd | B65D 65/403 229/90 |
| 11,794,439 B1 | 10/2023 | Cummings | |
| 11,938,705 B1 | 3/2024 | Cummings | |
| 12,064,943 B1 | 8/2024 | Cummings | |
| 12,116,192 B1 | 10/2024 | Cummings | |

* cited by examiner

*Primary Examiner* — Catherine A. Simone
(74) *Attorney, Agent, or Firm* — Wong Meyer Smith & McConnell

(57) ABSTRACT

The panel defined by the current invention is comprised of a creased base layer with cross flute bond lines facing in an upward direction bonded to a top liner with the crease side of the creased base layer bonded to a center liner which is then bonded to the crease side of another creased base layer with the cross-flute bond lines facing downward toward a bottom liner.

1 Claim, 2 Drawing Sheets

| PAPER BASIS WEIGHT COMPARISON CONVENTIONAL DOUBLEWALL VERSUS BEAM BOARD | | |
|---|---|---|
| | Conventional DW | Beam Board |
| Top liner | 35#/MSF | 26#/MSF |
| C medium | 37#/MSF[1] | 33#/MSF[1] |
| Inner Liner | 26#/MSF | 26#/MSF |
| B medium | 35#/MSF[1] | 31#/MSF[1] |
| Bottom Liner | 35#/MSF | 26#/MSF |
| BOARD BASIS WEIGHT | 168#/MSF | 142#/MSF |

[1] basis weight times takeup factor

Fig. 3

CREASE REINFORCED DOUBLEWALL CORRUGATED BOARD

CROSS-REFERENCE TO RELATED APPLICATIONS

This application claims the benefit of U.S. Provisional Patent Application No. 63/749,147, filed on Jan. 24, 2025, which is hereby incorporated by reference in its entirety.

FIELD OF THE INVENTION

The present invention pertains to products comprising paperboard panels and a method for their manufacture. More specifically, the panels are produced on a standard corrugator by suitable modification of the corrugated rolls associated with a singlefacer.

The panels are envisioned to replace conventional corrugated packaging for a variety of packaging applications thereby minimizing fiber content while still ensuring damage free delivery of goods.

BACKGROUND OF THE INVENTION

The market for corrugated packaging in the United States is approximately $40 billion per year. Ninety-five percent of all goods manufactured or grown in the United States are shipped in corrugated containers. Between 70%-80% of the cost of a corrugated container is the cost of the wood fiber used to make the product.

There are several types of corrugated board. Eighty percent of corrugated produced is called singlewall made from a top liner adhered to a fluted medium that is then glued to a bottom liner to produce a three-ply panel. The next most common board in the US market is doublewall which consists of a top liner adhered to a fluted medium that is then bonded to another liner also adhered to a fluted medium with bottom liner attached to finish this five-ply panel. It is this doublewall corrugated panel that is the focus of the current invention.

U.S. Pat. No. 11,794,439 B1, hereby incorporated by reference, describes a creased base layer (CBL) composed of a medium web that is fluted and creased simultaneously in the singlefacer allowing this web to be powered up onto the bridge of the corrugator without bonding it to a top liner. This patent also discloses bonding the CBL with downward facing cross flute bond lines to a top liner to create a SemiCorr Singleface Web (SSW) and then subsequently bonding this SSW to a bottom liner to create a SemiCorr product called Matrix Board. Singlewall Matrix Board is stronger than conventional singlewall because the in-line flexural stiffness of the board is substantially increased.

This patent also discloses bonding a top liner to the crease side of a CBL with cross-flute bond lines facing downward that are then bonded to the crease side of a second CBL of a different flute type with the cross-flute bond lines of this second CBL bonded to a bottom liner to define a four-ply doublewall panel.

A concern regarding this four-ply panel is that the width of the creases on the CBL bonded to the top liner in the case of larger caliper flutes would result in an untenable bond strength. In addition, there is concern about line-up of the cross-flute bond lines in the CBL attached to the top liner with the creases in the CBL attached to the bottom liner.

These issues were addressed in U.S. Pat. No. 12,064,943, hereby incorporated by reference. This patent discloses combining a conventional singleface web (SFW) of a larger flute type by bonding it to an inverted CBL of a smaller flute type with cross flute bond lines of this smaller flute CBL facing upward to prevent nesting of the flutes in a four-ply doublewall panel.

Yet there is concern about the cross-flute bond lines having structural integrity to prevent the nesting of flutes. When running lower basis weight paper, the starch applied to the SFW of the larger flute type may soak into the cross-flute bond lines of the smaller flute type weakening them so they are less able to prevent nesting of the flutes. Additionally, there is concern about having the crease side of the smaller flute CBL facing the bottom liner impacting the printability of the four-ply panel.

U.S. Pat. No. 11,938,705 B1, hereby incorporated by reference, describes a five-ply triplewall board comprised of three CBL's, a top liner and a bottom liner. The concerns regarding line-up of the cross-flute bond lines of the CBL's of one flute with the creases in the CBL's of another flute as well as structural integrity of the cross-flute bond lines when wetted by starch as noted above apply equally as well to the triplewall concept.

SUMMARY OF THE INVENTION

It is the objective of the current invention to resolve these issues by using CBLs to reinforce and make a stronger five-ply doublewall board. By making the five-ply panel stronger, fiber can be saved by downsizing the basis weights of the liners and mediums comprising the panel while retaining the same strength.

The panel defined by the current invention is comprised of a CBL with cross flute bond lines facing in an upward direction bonded to a top liner with the crease side of the CBL bonded to a center liner which is then bonded to the crease side of another CBL with the cross-flute bond lines facing downward toward a bottom liner.

In one embodiment, the present invention provides a doublewall board comprising a top liner; a center liner having a top surface and a bottom surface; a bottom liner; a first inverted creased base layer with multiple cross flute bond lines creased in-line at intervals across a web of a first flute type with cross flute bond lines facing upward that is bonded to the top liner; wherein exposed flutes and creases of a backside of the first inverted creased base layer are bonded to the top surface of the center liner; a second creased base layer with multiple cross flute bond lines creased in-line at intervals across a web of a second flute type with cross flute bond lines facing downward that is bonded to the bottom liner; and wherein exposed flutes and creases of a backside of the second creased base layer are bonded to the bottom surface of the center liner.

This five-ply panel (called Beam Board) is the doublewall equivalent of singlewall Matrix Board. It is reinforced by the creases making it much stronger than conventional doublewall using the same basis weight papers. The Beam Board concept can be applied to manufacture of triplewall board as well. Depending upon the specific flute types used to make the triplewall, the outer most flutes may be conventional SFW's with only the center or internal flute constructed as a CBL to provide the beam type construction of the board. The internal CBL with creases improves both the in-line and cross-corrugator stiffness of the board.

In addition, the Beam Board of the current invention has a much better print surface because the matrix of flutes and cross flute bond line glue lines eliminate the washboard phenomena. The creases of the Beam Board CBLs are attached to the internal liner of the board so they do not affect performance from a printability point of view.

The concerns of support and nesting of flutes associated with SemiCorr Four are eliminated. Cross corrugator strength of the board is greater because the creases that are bonded to the center liner are trusses that improve the cross corrugator flexural stiffness. Just as the strength of a beam used for construction is related to its outer edges, the strength of Beam Board is due to the top and bottom liners that are reinforced by the truss type support of the creases as well as the superior matrix type glue lines.

BRIEF DESCRIPTION OF THE DRAWINGS

The foregoing and other aspects of the present invention will become apparent to those skilled in the art to which the present invention relates upon reading the following description with reference drawings below:

FIG. 3 is a table showing paper basis weight comparison of conventional doublewall versus beam board with the weight expressed in pounds per 1,000 square feet (MSF).

DETAILED DESCRIPTION OF THE DRAWINGS

While the current invention is susceptible to embodiments in many different forms, there is shown in drawings and described in detail herein specific embodiments with understanding that the present disclosure is to be considered as an exemplification of the principles of the invention and is not intended to limit the invention to the embodiments illustrated.

Figure 1:
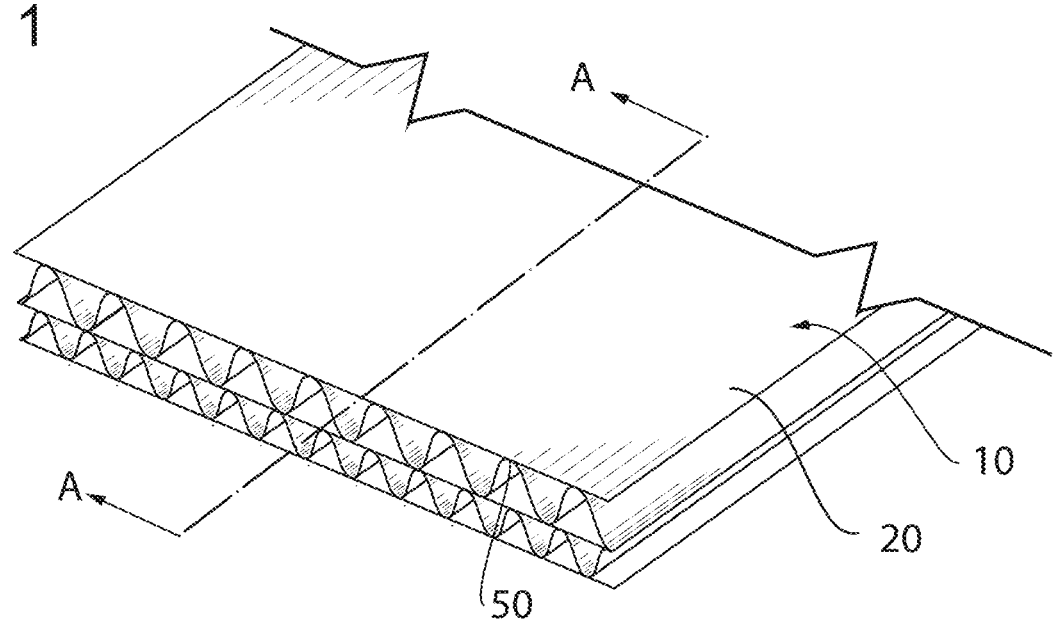
FIG. 1 is a perspective view of the Beam Board panel of the current invention.

Referring to FIG. 1 of the current application, a doublewall board 10 is constructed using a top liner 20 that is bonded to a creased base layer (CBL) 30 that has cross flute bond lines 40 facing in an upward direction. The cross-flute bond lines 40 and flute tips 50 provide a smooth matrix type support for the top liner 20. The crease side of CBL 30 is then bonded to center internal liner 60 which is then bonded to another CBL 70 that has cross flute bond lines 80 facing in a downward direction to bond to bottom liner 90.

Figure 2:
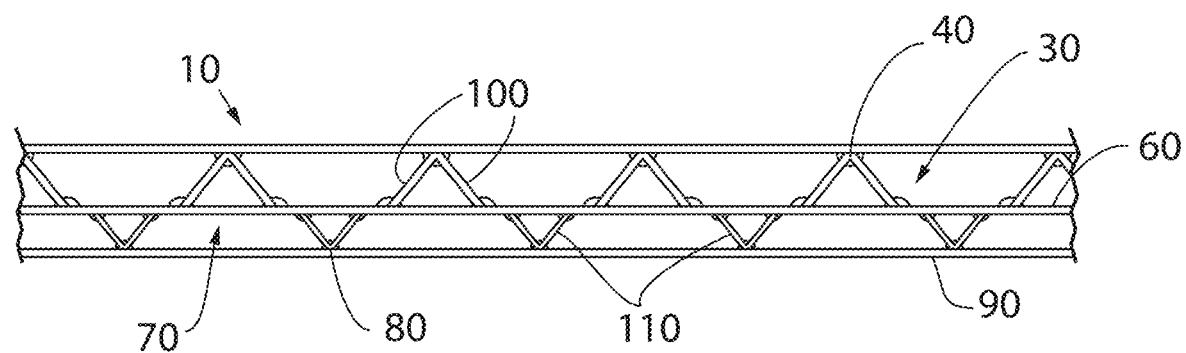
FIG. 2 is a cross section view of the Beam Board panel of FIG. 1.

As shown in FIG. 2, cross Section A-A of FIG. 1 clearly shows the internal construction of doublewall board 10. The cross-flute bond lines of CBL 30 face upward toward top liner 20 and cross flute bond lines 80 of CBL 70 face downward toward bottom liner 90. The crease sides of both CBL 30 and CBL 70 face toward the center internal liner 60.

The doublewall board 10 cross corrugator flexural stiffness is greatly improved over that of conventional doublewall because the slanted walls 100 of the top CBL 30 and slanted walls 110 of the bottom CBL 70 act as struts in a truss thus preventing bending moments from deflecting the board much like beams do in supporting the roof of a house or the deck of a bridge.

Referring to FIG. 3, Beam Board made from 26 #/thousand square feet (MSF) liners and 23 #/MSF mediums will have the same strength as conventional doublewall board made from 35 #/MSF liners and 26 #/MSF mediums with savings of 26 #/MSF, as shown in the table, which is the same fiber reduction anticipated for the four-ply SemiCorr Four board. The table shows basis weights for the medium grossed up to include the take-up factor so that the basis weight of the medium is the basis weight of the paper times the take-up factor which is 1.42 for C flute and 1.32 for B flute.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A doublewall board comprising:
   a top liner having an uncreased top surface and an uncreased bottom surface;
   a center liner having an uncreased top surface and an uncreased bottom surface;
   a bottom liner having an uncreased top surface and an uncreased bottom surface;
   a first inverted creased base layer defined by multiple cross flute bond lines creased in-line at intervals across a web of a first flute with cross flute bond lines and flute tips facing toward the top liner bonded to the uncreased bottom surface of the top liner;
   wherein creases of a backside of the first inverted creased base layer are bonded to the uncreased top surface of the center liner;
   a second creased base layer defined by multiple cross flute bond lines creased in-line at intervals across a web of a second flute with cross flute bond lines and flute tips facing toward the bottom liner bonded to the uncreased top surface of the bottom liner; and wherein creases of a backside of the second creased base layer are bonded to the uncreased bottom surface of the center liner.

* * * * *